United States Patent
Al-Rashed

(10) Patent No.: US 11,214,525 B2
(45) Date of Patent: Jan. 4, 2022

(54) MULTIPLE CRYSTALLIZATION ENHANCE (MCE) INTERMIX FOR PORTLAND CEMENT CONCRETE

(71) Applicant: Radi Al-Rashed, Plano, TX (US)

(72) Inventor: Radi Al-Rashed, Plano, TX (US)

( * ) Notice: Subject to any disclaimer, the term of this patent is extended or adjusted under 35 U.S.C. 154(b) by 0 days.

(21) Appl. No.: 16/989,520

(22) Filed: Aug. 10, 2020

(65) Prior Publication Data

US 2021/0040002 A1    Feb. 11, 2021

Related U.S. Application Data

(60) Provisional application No. 62/885,125, filed on Aug. 9, 2019.

(51) Int. Cl.

| | | |
|---|---|---|
| *C04B 40/00* | (2006.01) | |
| *C04B 28/04* | (2006.01) | |
| *C04B 24/06* | (2006.01) | |
| *C04B 22/06* | (2006.01) | |
| *C04B 103/69* | (2006.01) | |
| *C04B 103/50* | (2006.01) | |
| *C04B 103/40* | (2006.01) | |
| *C04B 103/30* | (2006.01) | |

(52) U.S. Cl.
CPC ........ *C04B 40/0039* (2013.01); *C04B 22/062* (2013.01); *C04B 24/06* (2013.01); *C04B 28/04* (2013.01); *C04B 2103/302* (2013.01); *C04B 2103/406* (2013.01); *C04B 2103/50* (2013.01); *C04B 2103/69* (2013.01)

(58) Field of Classification Search
CPC ....... C04B 12/04; C04B 22/06; C04B 22/062; C04B 22/103; C04B 24/04; C04B 24/06; C04B 24/42; C04B 28/04; C04B 40/00; C04B 40/0039; C04B 2103/40; C04B 2103/50; C04B 2103/406; C04B 2103/69; C04B 2103/302; C04B 2111/26; C04B 2111/28; C04B 2111/29; C04B 2111/00293; C04B 2111/2023; C04B 2111/2092
See application file for complete search history.

(56) References Cited

U.S. PATENT DOCUMENTS 5,747,171 A * 5/1998 Tokarz ................ C01B 33/149
427/397.7
7,429,295 B2 * 9/2008 Al-Rashed .......... C04B 41/5089
106/600

* cited by examiner

*Primary Examiner* — Anthony J Green
(74) *Attorney, Agent, or Firm* — Bell Nunnally & Martin LLP

(57) ABSTRACT

A water-based mixture of multi compounds for adding to fresh concrete to protect the concrete against moisture and moisture-associated problems. A hygroscopic and hydrophilic behavior of its crystallization system within a concrete matrix minimizes moisture transmission through capillaries and connected voids. As a result, the mixture may reduce moisture related problems, such as damage caused by repeated freeze and thaw cycles and chloride ion penetration as from deicing salts, as well as alkali-silica reactions, and other problems.

20 Claims, 7 Drawing Sheets

MULTIPLE CRYSTALLIZATION ENHANCE (MCE) INTERMIX FOR PORTLAND CEMENT CONCRETE

BACKGROUND

Technical Field

This invention relates generally to a water-based mixture of multi-chemical compounds and to a method of production thereof, and more particularly, to systems and methods for producing and using this mixture for protection of concrete against moisture related problems.

Background

Portland cement concrete (PCC) is basically a mixture of Portland cement, mineral aggregates and water. Additional components including supplemental cementitious materials and chemical admixtures that are frequently added to modify specific properties. The hydration of the cement (reaction between the cement and water) results in a strong and generally durable composite material.

Portland cement is comprised of four basic compounds: tricalcium silicate ($3CaO.SiO_2$ abbreviated as $C_3S$), dicalcium silicate ($2Cao.SiO_2$ or $C_2S$), tricalcium aluminate ($3CaO.Al_2O_3$ or $C_3A$) and tetracalcium aluminoferrite ($4CaO.Al_2O_3.Fe_2O_3$ or $C_4AF$). It should be noted that gypsum ($CaSO_4.2H_2O$) is interblended with the cement linker during the grinding process to control the rate of reaction of the $C_3A$ and prevent flash set. The relative amount of each of these compounds is controlled through either ASTM C150 or AASHTO T85 specifications, as well as the size distribution of the individual cement grains (Blaine fineness).

When Portland cement and water are thoroughly mixed and properly cured, the four primary components listed above undergo exothermic chemical reactions with water. These reactions form a hydrated amorphous structure with strong bonds thereby binding the mineral aggregates to form a rigid concrete micro and macro-structure. The hydration of the Portland cement grains (or particles) is initiated by the presence of water and proceeds according to both time and temperature.

The hydration products of $C_3S$ and $C_2S$ consist primarily of calcium-silicate-hydrate (multiple forms commonly referred to as CSH) and calcium hydroxide ($Ca(OH)_2$ or CH). The CSH forms a continuous lattice of interlocking "crystals" which bond together all of the constituents in the PCC (aggregates and partially hydrated cement particles). The CH is formed as discontinuous crystals and add somewhat to the initial structure of the hydrating paste. It is an undesired reaction byproduct, with negative impacts on concrete compressive strength and other durability issues. In its simplest form, the objective in developing high performance concrete is to maximize the amount of calcium silicate hydrates (CSH) while minimizing the formation of calcium hydroxide (CH). The $C_3A$ reaction produces ettringite (a hydrous calcium aluminum sulfate mineral) crystals which are both discontinuous and detrimental in that they can react in the presence of external sulfates.

As described in Marchon, D. and R. J. Flatt, 8—*Mechanisms of cement hydration*, in Science and Technology of Concrete Admixtures, P. C. Aïtcin and R. J. Flatt, Editors. 2016, Woodhead Publishing. p. 129-145, which is incorporated herein by reference, these primary reactions of $C_3S$ and $C_2S$ are shown in the following chemical equations:

$$2(3CaO.SiO_2)+6H_2O \rightarrow 3CaO.2SiO_2.3H_2O+3Ca(OH)_2 \qquad (1)$$

$$2(2CaO.SiO_2)+4H_2O \rightarrow 3CaO.2SiO_2.3H_2O+Ca(OH)_2 \qquad (2)$$

Both of these reactions are exothermic, with reaction (1) releasing a larger amount of heat than reaction (2). When cement is mixed with water, the temperature increases due to the exothermic nature of the interaction of anhydrous cement with water, as more particularly described in Livesey, P., A. Donnelly, and C. Tomlinson, *Measurement of the heat of hydration of cement*, Cement and concrete composites, 1991. 13(3): p. 177-185, which is incorporated herein by reference.

In the presence of water, the calcium hydroxide is dissolved resulting in a pH value above 12, within the concrete matrix, as described in Law, D. W. and J. Evans, *Effect of leaching on pH of surrounding water*. ACI Materials Journal, 2013, 110(3): p. 291, which is incorporated herein by reference. Such an alkaline environment is considered chemically aggressive to the cement paste and to other minerals in the aggregate. Associated problems include concrete deterioration resulting from the well-known alkali-silica reaction (a heterogeneous chemical reaction that takes place within concrete between the alkaline pore solution of the cement paste and silica content of the aggregate particles), as described in Hobbs, D. W., *Alkali-silica reaction in concrete*. 1988: Thomas Telford Publishing, which is incorporated herein by reference. Such problems reduce concrete durability and decrease structure sustainability. Several methods have been developed to overcome the problem of alkali-silica reaction, such as the use of silica fume or fly ash with the concrete mix. Silica fumes, as an additive, react chemically with calcium hydroxide in the presence of water within the concrete pores; this reduces the possibility of hydroxide to react with the aggregate silicates. It is targeted to have a reactive material in solution to be added to fresh concrete mix which is capable of transforming the calcium hydroxide into another useful component, utilizing the concept of converting the problem cause into a solution contributor, in the concrete structure.

It is important to note that the CSH and the hydrated cement matrix in general is comprised of solids, entrapped water in either the larger capillary pores or the gel porosity that is an intrinsic part of the CSH. In a standard mix design protocol, the water/cement (w/c) ratio is very important in controlling the relative spacing between the cement grains during hydration and therefore has a strong influence on the density of the CSH formation and the capillary porosity of the paste.

In addition, voids and an internal capillary system are formed within the concrete structure as a result of air entrapment and water evaporation during hydration, as well as water migration during settling of paste solids, as described in Meddah, M. S. and A. Tagnit-Hamou, *Pore structure of concrete with mineral admixtures and its effect on self-desiccation shrinkage*. ACI Materials Journal, 2009. 106(3): p. 241, which is incorporated herein by reference. Voids are also occupied by water vapor evaporated due to the heat generated from the exothermic reaction of cement hydration. The porosity of hardened concrete is a network of pores that are connected through a capillary three-dimensional network. Such porosity enhances the permeability of liquid and vapor water. The loss of water at early stages of concrete hydration, by vapor transport through the capillary network, slows down the hydration reaction. Thus, it is targeted to minimize water loss from the fresh concrete at early stages of hydration by minimizing the capillary network, potentially through the early formation of a pore-blocking system.

For cured concrete, a limited degree of porosity is essential for concrete "breathing." Concrete breathing occurs through the evaporation of water vapor as it escapes through capillaries. Transport of vapor can be accomplished through small capillary sizes. However, high porosity of concrete (with large voids and capillaries) increases the permeability of water and other water-soluble components that are harmful to the concrete structure, through flow and diffusion mechanisms, resulting in various water-associated problems. These include concrete deterioration as a result of internal stresses from repeated cycles of freeze and thaw (see Zou, C., et al., *Degradation of mechanical properties of concrete caused by freeze-thaw action*, Journal of Building Structures, 2008, 1, which is incorporated herein by reference), corrosion of steel as a result of chloride ion diffusion within water filled capillaries (see Glass, G. and N. Buenfeld, *Chloride-induced corrosion of steel in concrete*, Progress in Structural Engineering and Materials, 2000. 2(4): p. 448-458, which is incorporated herein by reference), deterioration resulting from the well-known alkali-silica reaction, and deterioration due to mold and mildew growth on concrete (see Viitanen, H., et al., *Moisture and bio-deterioration risk of building materials and structures*, Journal of Building Physics, 2010, 33(3): p. 201-224, which is incorporated herein by reference). Such problems reduce concrete durability and decrease structural sustainability. Such conditions may result in further problems like concrete spalling, shrinking, silicate dusting, stress cracks, laitance and efflorescence (see FIG. 1).

In climates where repeated cycles of freezing and thawing occur, concrete with sufficient moisture is susceptible to damage. When the temperature drops below the freezing point of the moisture in the concrete, ice starts to form within the pores of concrete, which is associated with a decrease in density, resulting in internal stresses. Since water increases its volume by nearly 9% on freezing, water confined in pores between freezing bodies are therefore under compression and pores may dilate causing an increase in the internal stress against the surrounding concrete particles. Repeated freeze and thaw cycles result in the rupture and deterioration of the concrete structure due to fatigue stresses.

The permeability of concrete allows chloride ions, coming from the de-icing salts that are dissolved in water, to penetrate through the capillary network by the mechanism of water penetration flux. In addition, the osmotic process and the mechanism of diffusion promotes the chloride ions diffusion from the solution regions of high concentration to those of low concentration. There is a driving force of ion diffusion, under wet conditions; since the concentration of chloride ions within the concrete is lower than that at the external surface where deicing salts are spread. Chloride ions are oxidizing agents and accelerate the corrosion of steel reinforcing bars, thus reducing the life expectancy of the concrete structure. In addition, chloride ions attack the concrete matrix by breaking the cement paste bond. This leads to the formation of cracks that weaken the structure and creates surface dusting.

Mold is an essential part of the natural environment but has some very significant and negative impacts on concrete. Mold can grow on the surface of concrete resulting to potential health issues as well as deterioration of the concrete on which it grows. Molds are dispersed through airborne movement and can grow on virtually any unprotected concrete surface when conditions are conducive to mold growth. Molds grow by breaking down organic materials. Such growth requires favorable conditions, including oxygen, proper temperature and organics as a food source. In the presence of moisture, mold can feed on bacteria, salts, dust, dirt, and other particles trapped within concrete. Moisture build-up on the subsurface of the concrete and within its capillary pores can facilitate mold growth. Mold also relies on carbon dioxide from the atmosphere for continued growth. Mold growth produces an acid that can degrade concrete, compromising its strength and integrity. As mold degrades concrete, its structure becomes more porous, allowing for increasing water penetration and water-associated problems. Having a moisture free subsurface of concrete can minimize mold growth.

Previous treatments of existing concrete structures included the use of solutions of water glass to partially neutralize the alkali materials within the concrete through a chemical reaction that produces silica gel material inside the pores (U.S. Pat. No. 5,747,171 to Tokarz et al., entitled Method of protecting a surface, which is incorporated herein by reference). However, because such solutions have not had a very low viscosity, their penetration efficiency has been very low. Therefore, treatment with water glass solutions has typically been ineffective especially for depth treatment of the concrete pavement, which makes them less effective in addressing high hydrostatic pressures from below. In addition, the application of oil based products and water repellant materials to the surface of concrete pavements have a limited effectiveness in reducing water penetration from the surface as they increase the surface tension of water to a degree that prevents it from passing through capillaries. However, such methods alone do not address moisture transmission from the negative side of the substrate, and it does not respond to the problems associated with water phase changes. It does not address the high hydrostatic pressure. In addition, a single crystallization system with Portland cement in a slurry phase has been applied to the surface as a thin coat. The produced crystals within the cured coat blocks moisture transmission because of the crystal growth process as a result of the relatively high affinity to moisture of these crystals. However, such method cannot be used on concrete pavement and road ways because it cannot resist mechanical impacts from traffic. Such treatments of different technologies fail to deal with water problems associated with all water phases.

A dual crystallization system combining hygroscopic and hydrophilic characteristics with water-repelling behavior has been proven as a sustainable solution for water-associated problems in concrete pavements through spray-on application. For example, U.S. Pat. No. 7,429,295 to Al-Rashed (the inventor of the present application), entitled Aqueous Chemical Mixture to Mitigate Water Associated Problems in Concrete Pavements ("the '295 Patent"), which is incorporated herein by reference, describes such a method applicable to cured and aged concretes. It is applied as a subsequent step to concrete curing. In response to the need for a solution for concrete durability problems, International Chem-Crete Corporation has established an industrial record in developing and promoting crystallization technology for pore blocking in concrete structure, including dual characteristics of hygroscopic and hydrophilic. In the '295 Patent, dual crystallization technology was invented for solving the above-mentioned problems through surface spray application of Chem-Crete Pavix® product, which is a water-based mixture of multi compounds invented for the purposes of treating and providing a concrete protection. The technology is based on a multi-component reactive solution that undergoes various chemical reactions to form crystals and products with hygroscopic, hydrophilic and water repelling behaviors.

Thus there is a need for an innovative technology that can provide multi-solutions to the water-associated problems and concrete durability problems through direct addition to fresh concrete.

SUMMARY OF THE INVENTION

The present invention comprises a Multiple Crystallization Enhancer (MCE) that may be provided as a multi-compound aqueous solution to improve the hydration of Portland cement and thereby enhance both durability and sustainability. In various embodiments, the MCE may provide long-term protection for Portland cement concrete (PCC) against water penetration, in all its phases, and moisture-related distress including freeze/thaw, chloride intrusion, alkali-silica reactivity (ASR), mold growth, and others.

In some embodiments, the MCE may be based on compatible compounds with the cementitious materials, and formulated as an integral part of the concrete structure. In a preferred embodiment, the MCE may be environmentally friendly with little or no volatile organic content (VOC) emissions. Such a solution may be able to address multiple significant durability problems and water associated problems in concrete pavements through being a part of the typical concrete casting and curing processes, without the need for a further treatment, which may be especially beneficial for large areas of pavements such as concrete highways, bridges and airport runways. In various embodiments, the MCE may be a concrete enhancer that can be mixed with fresh concrete and able to build its functions within early stages of cement hydration and become an integral part of the concrete structure with multi-crystallization and functional characteristics.

In some embodiments, the MCE may be provided in a ready-to-use state, provided in a single container with no additional preparation needed prior to use or may be provided in multiple containers to be mixed prior to or at the time of use. The material may be mixed with the PCC at the time of batching and may be applicable to both ready-mixed and central mix production. The MCE preferably becomes an integral part of the PCC and contributes to the initial hydration through temperature and moisture management.

In various embodiments, the MCE may be based on an advanced multi-crystallization technology, that is characterized with triple functions of hygroscopic, hydrophilic and hydrophobic, formed within the concrete during hydration. The crystal growth does not materially inhibit the normal hydration reactions and resides primarily in the capillary pores during initial and final set of the cement. The MCE may be uniformly distributed throughout the paste fraction of the concrete by dissolution in the mix water at the time of batching. The modification of the PCC pore structure is partially responsible for the reduction in water in the concrete, and the crystallization system is interactive with water, and thus it associates with water reaching the pores, thereby improving concrete engineering properties and reducing moisture-related distresses.

In various embodiments, the MCE may be used to help protect hardened Portland cement concrete from moisture-related forms of distress. It may be used in concrete pavements (highways, airfields, streets and roads, parking lots, etc.) although it may be applicable to virtually any concrete placement including structural installations. Use of the MCE may result in improved cement hydration, a reduction in porosity and improved durability, and long-term sustainability of the concrete.

Various embodiments relate to the formulation of a multi-crystallization system within the pore structure (primarily capillary pores) of the concrete using a water-based material containing multiple chemical compounds and a method of producing the MCE and incorporating the material into concrete at the time of batching or as a field mixed component in fresh PCC. In some embodiments, the MCE may be effective in reducing concrete durability problems related to moisture intrusion, such as those shown in FIG. 1, by reducing water penetration, freeze/thaw damage, chloride ion penetration, alkali silica reactivity, mold and mildew growth and other moisture-related damage.

The above summary of the invention is not intended to represent each embodiment or every aspect of the present invention. Particular embodiments may include one, some, or none of the listed advantages.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

The present invention is directed towards methods of making and using a complex water-based mixture of several active chemicals that, when added to fresh concrete, undergo a series of chemical reactions, providing a multiple solution to concrete durability problems and water associated problems. In various embodiments, a Multiple Crystallization Enhance (MCE) may be provided that enhances cement hydration and minimizes water penetration into cured concrete through reducing capillarity sizes, which in turn improves concrete durability. This is accomplished by minimizing water transport through the concrete matrix, by generating a multiple crystallization system filling the concrete voids and capillary network, combining hygroscopic, hydrophilic and hydrophobic behaviors. The MCE may help protect concrete pavement, concrete bridges, concrete highways, airport runways, concrete taxiways, and other applications. The MCE mixture may be compatible with most water reducers and air entrainment materials used in concrete mix design.

Figure 1:
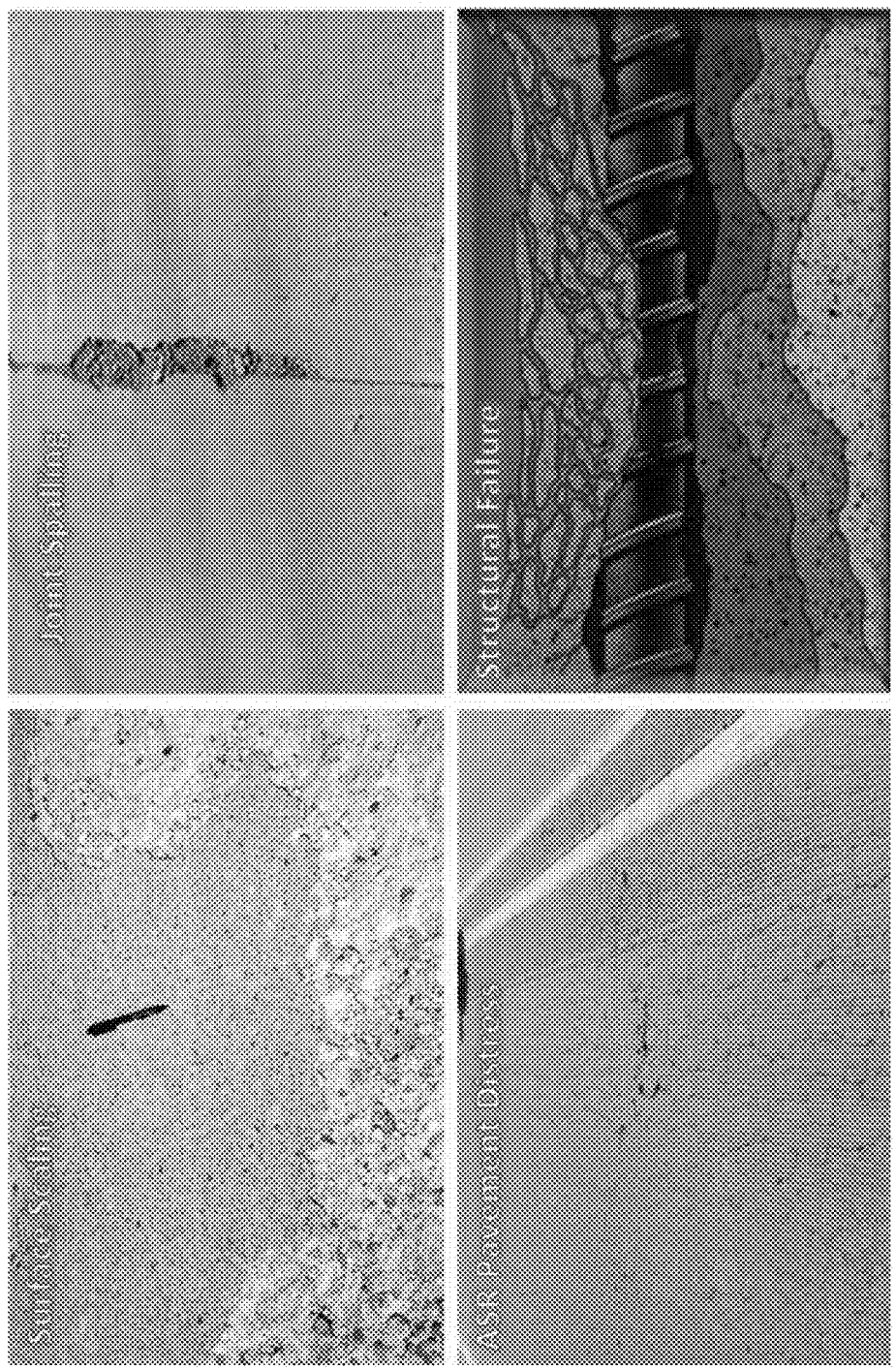
FIG. 1 illustrates common water associated problems in concrete pavements.
Figure 2:
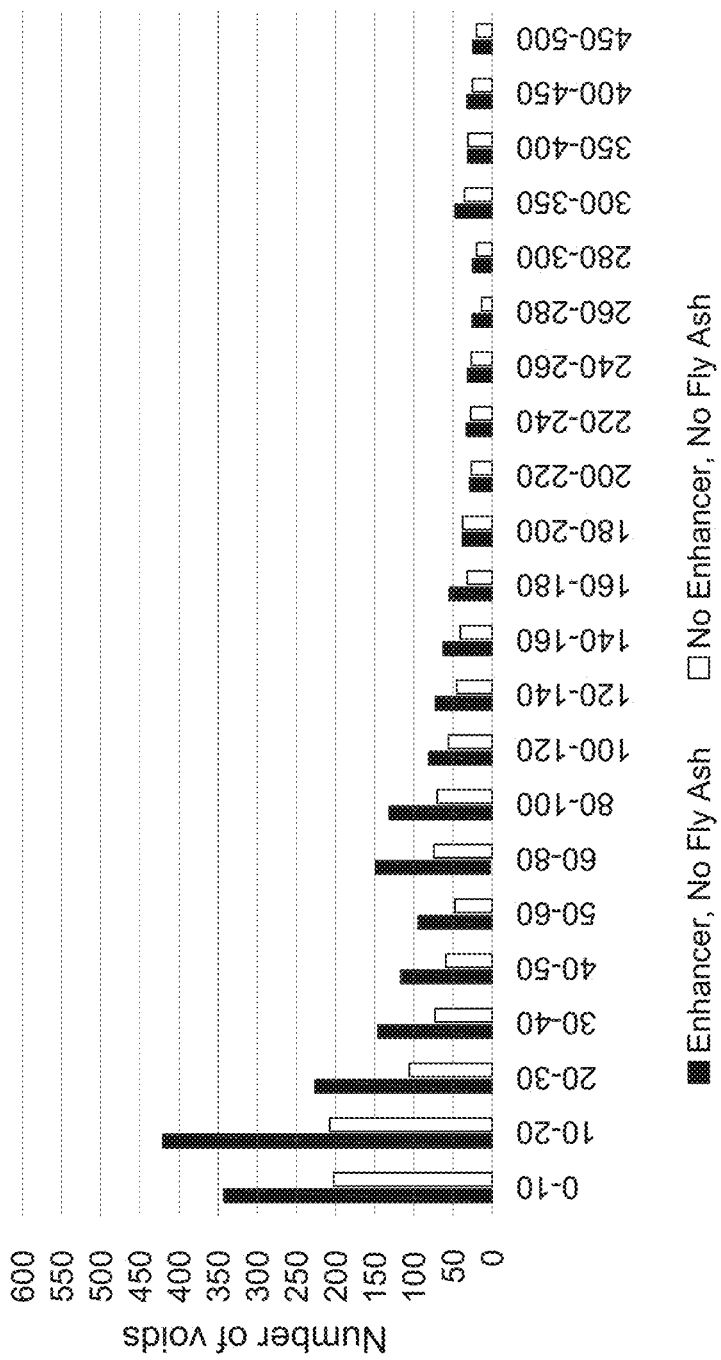
FIG. 2 illustrates pore size distribution of concrete with MCE enhancer compared to that of control samples without enhancer.

Referring now to FIG. 2, the effective crystallization mechanism of MCE may decrease the pore size within a concrete structure. This is indicated in FIG. 2 with a larger percentage of small voids obtained when 2% MCE is added compared to control samples (for a mix design of IDOT C4).

The mix was created at a water-to-cement ratio of 0.4. The results shown in FIG. 2 are from an independent laboratory testing according to ASTM C 457 and ASTM C 1585.

In various embodiments, the MCE may enhance cement hydration and protection of concrete pavements when added as an aqueous chemical mixture to fresh concrete. The using and the curing of the product within the cement hydration and concrete curing processes achieve, by one mixture, blocking water penetration within concrete capillary network by a multiple crystallization system with hygroscopic, hydrophilic and hydrophobic characteristic, that is integrated within concrete structure.

Through these functional characteristics, the MCE may provide a long-term sustainable solution for major water related problems in concrete and increase concrete resistivity to water penetration. The use of MCE with a fresh concrete mix may result in major reductions in concrete damage due to freeze and thaw cycles, chloride ion penetration, alkali-silica reactions, and mold and mildew growth on concrete.

Figure 3:
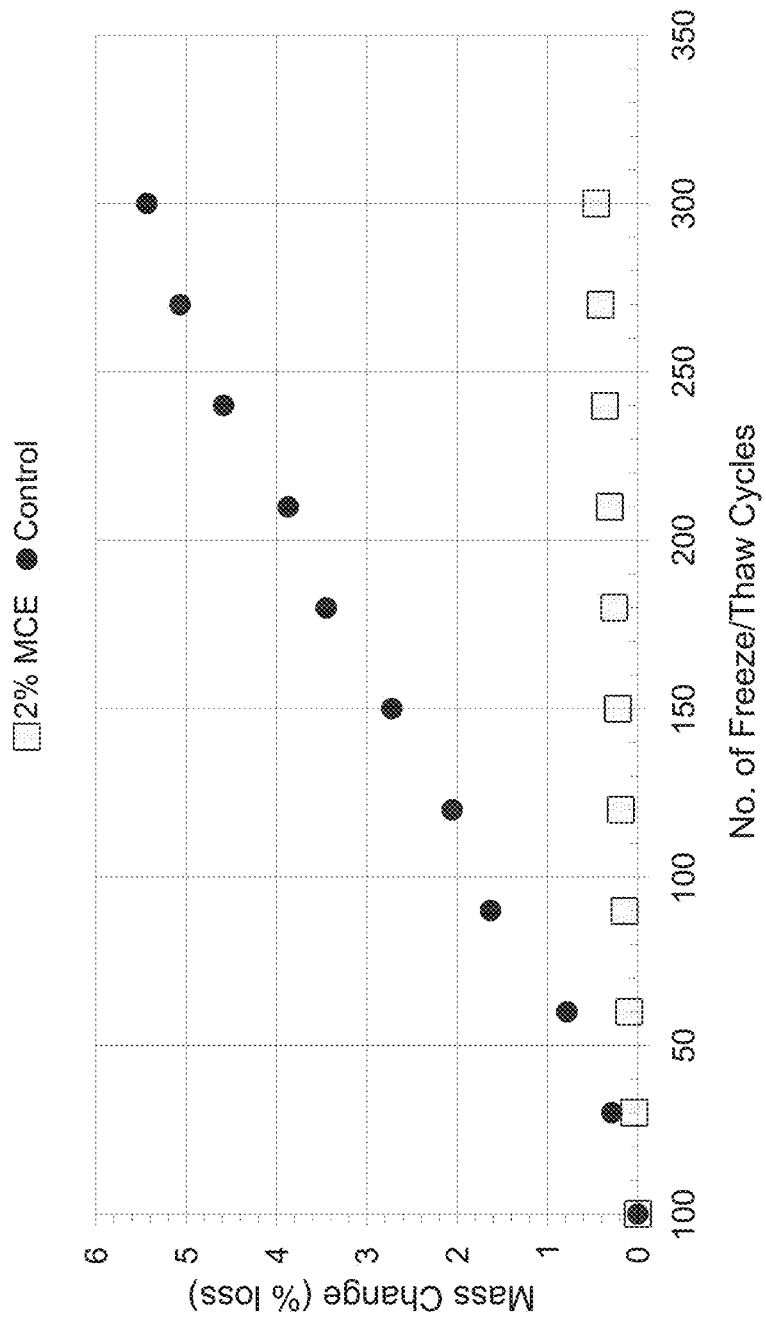
FIG. 3 illustrates increasing resistance to freeze thaw cycles with MCE.

Referring now to FIG. 3, the effective crystallization mechanism of MCE may result in a major increase in the concrete resistivity to freeze-thaw cycles. Experimental data of IDOT C4 mix concrete samples with 2% MCE indicate a reduction of mass loss by 91.6% and an increase in the relative dynamic modulus by 20.3%. The mix was created at a water-to-cement ratio of 0.4. The results shown in FIG. 3 are from independent laboratory testing done according to ASTM C 666.

Figure 4:
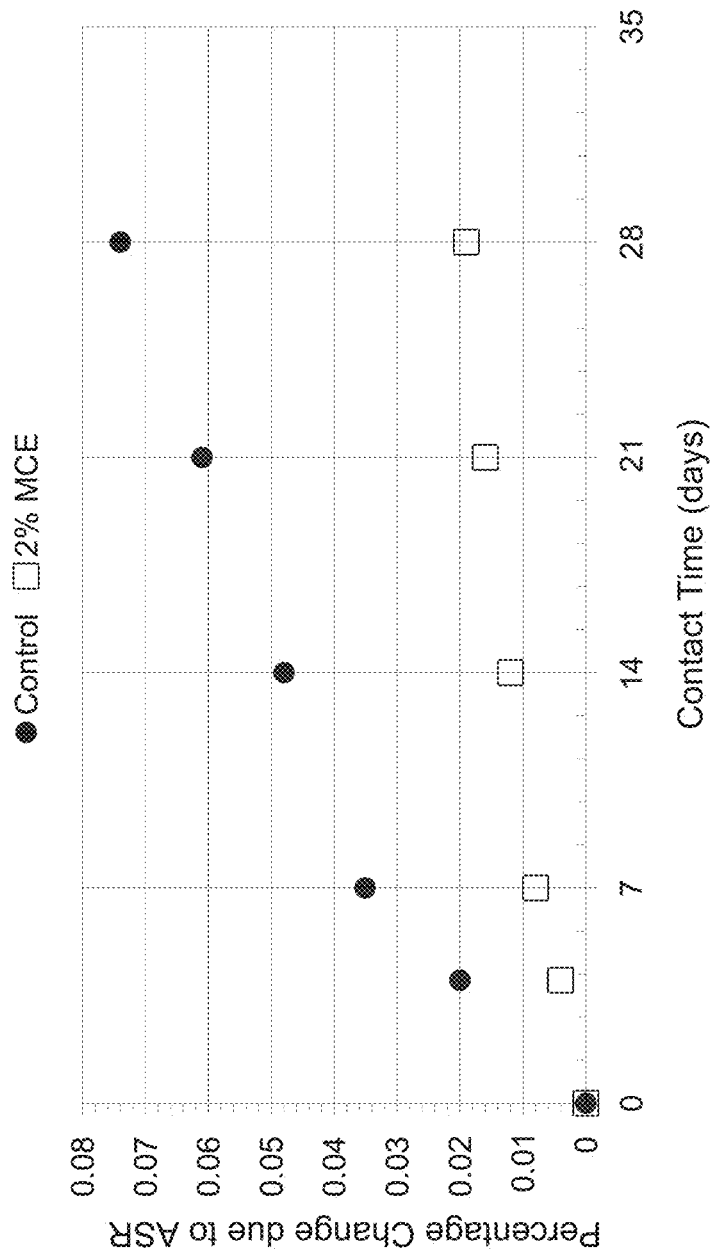
FIG. 4 illustrates increasing resistance to the alkali-silica reactions with MCE.

Referring now to FIG. 4, the effective crystallization mechanism of MCE may increase the concrete resistivity to alkali-silica reactions. Tests were performed by an independent laboratory according to the provisions of ASTM C 1567, using IDOT C4 PCC mix, utilizing Martin Marietta Ames Mine coarse aggregate and Hallett Materials North Des Moines fine aggregate (presented results). Other tests were made utilizing a sand/gravel mixture with aggregates from the Platte River area, west of Omaha, Nebr. The water-to-cementitious ratios chosen were 0.39. Other tests were performed at other w/c ratios of 0.43 and 0.47. As shown in FIG. 4, experimental data of IDOT C4 mix concrete samples with 2% MCE indicate a major reduction in ASR (in the range of 32-74% depending on the mix design and aggregates).

In various embodiments, the MCE is provided as an aqueous mixture, which may be shipped and stored in a single container, and preferably added to fresh concrete. The mixture is composed of several chemical compounds that are dissolved in water and prepared in the form of a relatively stable aqueous solution on the order of approximately 75% by weight water. In other embodiments the aqueous solution may be between 70-80% by weight water, less than 70% by weight water, or more than 80% by weight water, depending on various factors, including, for example, the environment, materials used, and design specifications. Preferably the water includes deionized water, but other types of water can be used. The uniform product may include organic acids (2,3-dihydroxybutanedioic acid and ethanoic). In some embodiments, the compounds include at least one surfactant. In some embodiments, the compounds include at least one anti-foaming agent. In some embodiments, the compounds include at least one emulsifier agent. In some embodiments, the compounds also include sodium salt of carbonic acid. In some embodiments, the compounds include alkali metal silicate and silanetriol, methyl-, potassium salt.

In various embodiments, the MCE may be added at the beginning of batching or at the end. The MCE may be added to fresh concrete at a percentage on the order of 1-4% by weight of the binder mass of concrete mix. In some embodiments, the percentage may be less than 1% by weight of the binder mass of concrete mix or may be more than 4% by weight of the binder mass of concrete mix. As the concrete curing process proceeds, various chemical reactions take place forming compounds that become integral parts of the concrete structures, and have the capability to hold the generated heat of hydration in fresh concrete. Altering the concentration and/or percentage of the MCE added may change the level of crystallization (size and formation) and thus the level of product performance. In various embodiments, the MCE may be produced as a stable containerizable aqueous mixture for adding to a fresh concrete mix to protect from water associated problems and enhance the cement internal hydration by reducing cement capsulation and particle coagulation.

In one embodiment, the MCE may be formulated by combining eight different chemicals in a mixture form using deionized water. While a working quantitative chemical composition can be achieved if a mixture is prepared using the formulation given in Table 1 below on weight basis, other percentages and formulations may also be used to achieve similar results or varied results depending on the needs of a particular project. Such a composition should, in various embodiments, provide a mixture with a solid content in the range of 12-18% that has a very low viscosity, within a range of 3-8 centipoises (CPI).

TABLE 1

Example of a chemical composition of an embodiment of MCE

| No. | Chemical Name | Composition, wt % |
|---|---|---|
| 1 | Deionized water | >75% |
| 2 | Ethanoic acid | <0.5% |
| 3 | 2,3-Dihydroxybutanedioic acid | 0.75-2.0% |
| 4 | Anhydrous sodium salt of carbonic acid | 1.0-2.0% |
| 5 | Alkali metal silicate solution (55% solid content) | 2.5-6.5% |
| 6 | Silanetriol, methyl-, potassium salt (55% aqueous solution) | 1.6-2.8% |
| 7 | Nonylphenol Polyethylene Glycol Ether (pure) | <0.5% |
| 8 | Isopropyl Alcohol (Anhydrous) | <0.5% |
| 9 | Alkylbenzensulfonic Acid (pure) | <0.01% |

Production of the MCE may utilize a multi-step procedure for mixing the chemicals to minimize interactions that may cause the material to crystallize during manufacturing and/or resulting in an unstable product. For this purpose, in various embodiments, a stirred tank reactor vessel with a medium speed agitator with an efficient ventilation system may be utilized. In various embodiments, the chemicals are mixed in stages.

In one embodiment, the method comprises gradually adding 2,3-Dihydroxybutanedioic acid to water while continuously agitating the mixture and then adding sodium salt of carbonic acid, and mixing. In some embodiments, the method may also include adding ethanoic acid after complete addition of the 2,3-Dihydroxybutanedioic acid and sodium salt of carbonic acid. In some embodiments, the method may also include gradually adding alkali metal silicate to the solution of 2,3-Dihydroxybutanedioic acid, sodium salt of carbonic acid and ethanoic acid. In some embodiments, the method may also include adding a water-based mixture of at least one surfactant, at least one anti-foaming agent, and/or at least one emulsifier to the solution and mixing. In some embodiments, the method may also include slowly introducing an amount of silanetriol, methyl-, potassium salt to the solution and mixing for an extended period of time, on the order of two to three hours, or less than two hours, or more than three hours. In some embodiments, the method may also include allowing the solution to settle for a period of time in the reactor before packaging. In some embodiments it may be allowed to settle for approximately three hours, less than three hours, or more than three hours. Finally, in some embodiments, the product may be filtered using, for example, a 10 µm filter media before packaging.

The chemical and functional mechanism of various embodiments of the MCE is based on a system of simultaneous chemical reactions and physical interactions with water. The system reactions occur within the produced capillaries and pores of the concrete matrix as a result of adding an embodiment of the MCE. They occur during cement hydration and concrete curing. Those reactions are triggered and/or accelerated by the increase in the concentrations of chemicals as a result of water consumption in cement hydration and water evaporation from the exothermic heat of hydration process.

In various embodiments, the product system involves dissociation reactions of disodium (2R,3R)-2,3-dihydroxybutanedioate, the ethanoic acid, the alkali metal silicate and silanetriol, methyl-, potassium salt. These reactions result in having multi alkali metal ions, multi organic and mineral positive ions. In addition, the dissolution of calcium hydroxide, which is generated from the cement hydration process (e.g., reactions (1) and (2) in the background section), results in providing calcium positive ions, for becoming part of the interacting species in the mechanism of system performance. These ions compose the reaction media for the product upon its addition to the concrete mix.

When added to fresh concrete, and as the cement hydration process proceeds, the amount of water decreases within the formed pores and capillary network. Under these conditions, crystallization reactions start to occur forming multi-hygroscopic crystals that grow with water. The reactions of (2R,3R)-2,3-dihydroxybutanedioate ions involved produce white crystals of disodium (2R,3R)-2,3-dihydroxybutanedioate. A sophisticated crystallization system of these ions is created due to the availability of potassium and calcium ions that competes with sodium ions on other crystallization reactions within the concrete structure. Produced crystals may include dipotassium 2,3-dihydroxybutanedioate crystals, crystals combining (2R,3R)-2,3-dihydroxybutanedioate with both sodium and potassium. In addition, a potential reaction with calcium ions coming from the calcium hydroxide (as a by-product from reactions (1) and (2)) with (2R,3R)-2,3-dihydroxybutanedioate, producing 2,3-dihydroxybutanedioic acid calcium salt crystals. Also, reactions of ethanoic acid with available excess alkali metal ions may contribute in forming an additional crystallization system of sodium ethanoate, potassium ethanoate and white crystals of calcium ethanoate (which assist in reducing the concrete alkalinity and in reducing the calcium hydroxide content of the concrete). This complex multiple crystallization system is formed within the pores and capillary network of concrete, providing a blocking mechanism against water penetration and having the hygroscopic characteristics of crystal growth with water, making the blocking mechanism more efficient and able to manage water in its three phases.

In addition to these reactions with (2R,3R)-2,3-dihydroxybutanedioate and ethanoate ions, $SiO_3^{2-}$ ions, when it comes in contact with calcium ions, coming from the dissociation of calcium hydroxide, produces insoluble hydrophilic particles of $CaSiO_3$, that are formed within the pores and capillary system of concrete, which expand with water swelling for better pore blocking. The reaction is believed to take place on the surfaces of tiny undissolved $Ca(OH)_2$ particles, providing them with $CaSiO_3$ crystal. Such a reactivity mechanism has two benefits: (1) consuming the undesired $Ca(OH)_2$, which when it remains with the concrete structure competes with silicates on water molecules, and (2) resulting in protective materials that serve in the triple functional system of the mixture. This mechanism utilizes the concept of converting the problem cause into a solution contributor in the concrete structure.

Then, as the cured concrete dries, and becomes accessible to air, the capillary network is filled with air (a source of carbon dioxide). Then, the trihydroxy(methyl)silane ions react with carbon dioxide ($CO_2$) from air, to form an insoluble water-resistant treatment, which continues until most, if not all, trihydroxy(methyl)silane ions are reacted. This reaction can continue over a long period of time, e.g., months and/or years, for additional protection. This chemical reaction is activated with UV light at the surface, producing an invisible resin-like material that coats the concrete surface as well as the walls of capillaries and pores, and becomes part of the concrete structure through a chemical bond that is highly resistant to strong acids and alkali solution as well as most aggressive chemicals. The resulting material is hydrophobic that is synergized with the dynamic multi crystallization system, since simple hydrophobic function is often not sufficient for efficient waterproofing and for solving concrete durability problems. This additional characteristic of hydrophobicity (combined with the multi crystallization mechanism) may increase the surface tension of water contacting the concrete to a degree that assists in a further reduction in water penetration in concrete pavements through capillaries. This contribution may ensure having dry subsurface within the concrete pavement and assist in preventing the moisture build up within the concrete, and synergize with the dynamic interaction of the hygroscopic and hydrophilic crystallization system with water.

The functional characteristics that are generated through the series of chemical reactions indicated in the above section, may provide a long-term solution for the concrete durability problems and water related problems, and increase concrete resistivity to water penetration. The formation of these crystals during the cement hydration process allow them to be able to combine with the concrete structure. Various aspects of the mechanism can be summarized in the following examples.

As shown in FIG. 2, the effective crystallization mechanism of the MCE decreases the pore sizes within concrete structure (i.e., it creates a larger fraction of nano- and micro-scale capillaries). It also blocks the capillary network by the formation of multiple crystals. Decreasing the size of the capillary system assists in maintaining a larger fraction of water molecules within the concrete structure, through minimizing early water loss, as a result of increasing the flow and diffusional resistances in the nano- and microcapillaries. The entrapped vapor and liquid water molecules interact with the crystalline system by two mechanisms: (1) bonding with the hygroscopic crystals yielding their growth (and minimizing free water in concrete subsurface), and (2) swelling within the hydrophilic crystals, yielding their expansion. In addition, the hydrophobicity of the invisible resin-like material generated from the methyl-siliconate reaction increases the surface tension at the external surface and at the internal surface of the capillary network. This sophisticated mechanism creates more resistant to water flow through concrete capillary network in all water phases, and thus reduces water penetration problems in concrete.

The effective crystallization mechanism results in a reduction in the available free water in the concrete subsurface that is able to freeze within the pores at freezing temperatures, and thus reduces the internal stresses resulting from freezing associated with water volume expansion. As shown in FIG. 3, this function increases the concrete resistivity to freeze-thaw cycles.

The reduction in water penetration from the surface as a result of the effective crystallization mechanism of the MCE minimizes the possibility of transporting chloride ions from the deicing salts, by penetration through the network. The relative dryness of the concrete pores creates a discontinuity in water medium that eliminates the possibility of chloride ion penetration by diffusional flux derived by the concentration deference between surface regions and internal concrete regions. In addition, the hygroscopic behavior of the crystallization system consumes potential free water that reaches the pores in crystal growth and thus reduce the medium for the activity of chloride ions, thus the MCE reduces the associated problems with chloride ion penetration, such as the corrosion of steel reinforcing bars, and minimizes chloride ions attacking the concrete matrix by breaking the cement paste bond, and thus reduces the formation of more cracks that weakens the structure and prevents surface dusting.

The consumption of calcium hydroxide, produced from cement hydration reactions (1) and (2), through the above mentioned reactions, reduces its content in concrete. In addition, the reduction of free water medium through utilizing water by crystals hygroscopic growth reduces the ability of solvation of any available calcium hydroxide and minimizes its reactivity, and thus minimizes the availability and the possibility of hydroxide to react with the aggregate and silicates. As shown in FIG. 4, this mechanism reduces the alkali-silica reactions. In a similar mechanism, the MCE may also minimize alkali-carbonate reaction (ACR) suspected for the degradation of concrete containing dolomite aggregate.

As the MCE reduces water penetration from the surface, as a result of the effective crystallization mechanism and hydrophobicity function, it minimizes the possibility of transporting contaminated water by flow through the network. The relative dryness of the concrete pores and the hygroscopic behavior of the crystallization system consumes potential free water that reaches the pores in crystal growth and thus reduce the essential medium for the activity of mold and mildew growth. Preventing moisture build up on the subsurface of the concrete through the created hydrophobicity of capillaries network assists in preventing hosting mold growth. The prevented mold growth reduces the possibility of acid generation through bacterial activity and thus reduces degrading concrete due to such an acidity. Such a positive impact maintains concrete strength and integrity, and reduces the possibility of creating a more porous concrete structure. Thus, by having a moisture free subsurface of concrete through the sophisticated mechanism of the MCE, the concrete durability problems associated with mold growth are reduced.

The MCE's reactivity with calcium hydroxide (the by-products of reactions (1) and (2)) has a positive effect on pores and capillary sizes. First, it converts the calcium hydroxide into concrete harmless product ($CaSiO_3$) thus preventing its reactivity through the alkali silica reaction that, when it occurs, increases the pores size. Second, the product of such a reaction fills the pores and capillaries and expands with water due to its hydrophilic behavior. These two mechanisms contribute in decreasing concrete pore size and capillary network.

The conversion of calcium hydroxide through the system reactions of the MCE assists in driving the cement hydration according to reaction stoichiometry and kinetics. In addition, decreasing the size of the capillary system, possibly to a nano-scale, maintains a portion of water within the concrete structure as a result of increasing the flow resistance in the nano-capillaries. The entrapped water is an essential medium for hydration. The MCE assists also in entrapping water vapor molecules, which are evaporated as a result of heat of hydration, within the nano-capillary system and thus minimize energy loss associated with the escape of water vapor (as a latent heat). The latent heat of vapor is then given back as a sensible heat to the system. Such a heat can activate further cement particles for more hydration. This makes the product efficient for promoting cement hydration even at severe low temperature curing. These mechanisms enhance the cement hydration process. Such an efficient hydration process may minimize plastic shrinkages, map cracking, and surface flaking and dusting.

Figure 5:
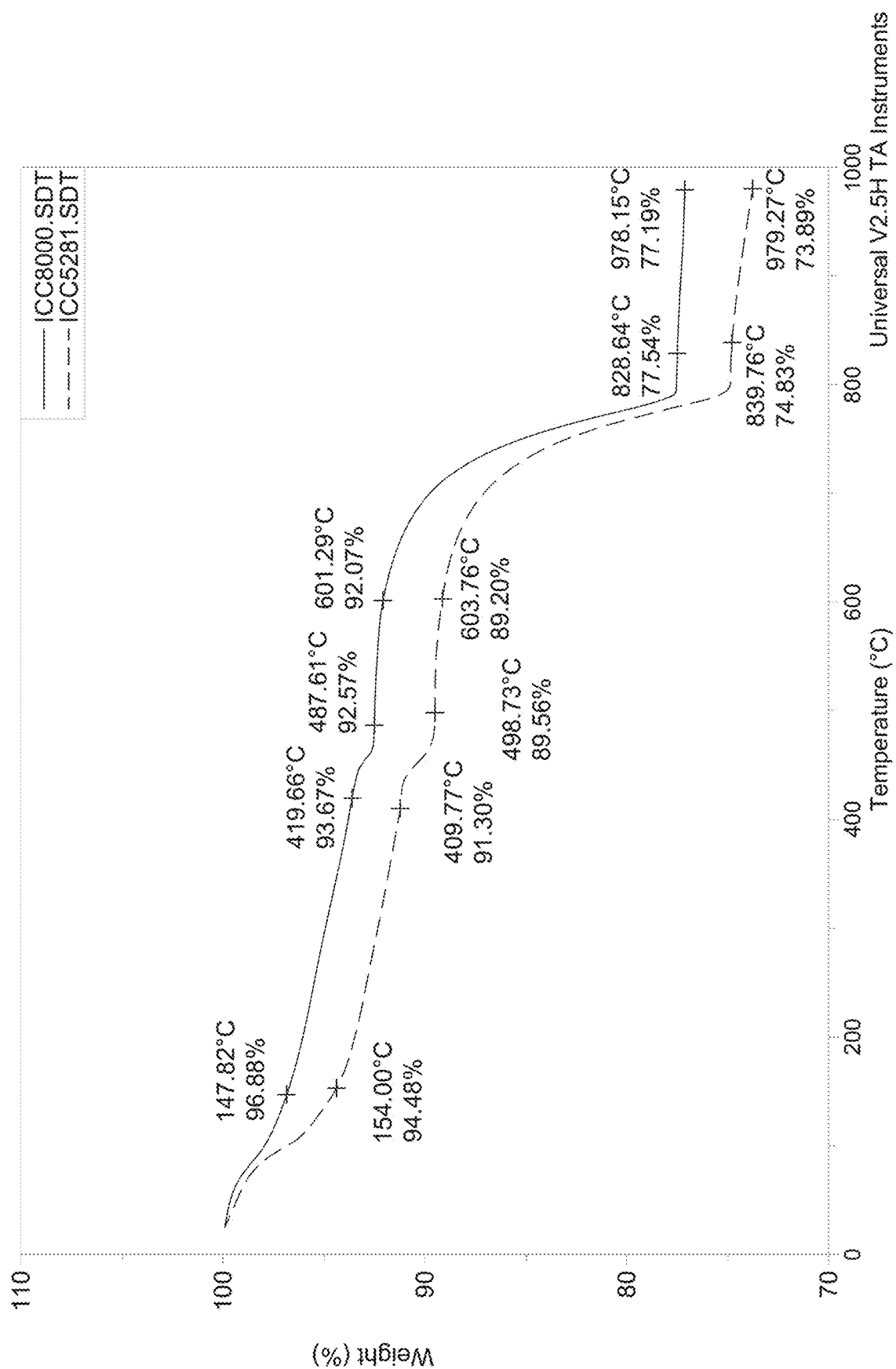
FIG. 5 illustrates enhanced cement hydration process with MCE.

The effective crystallization mechanism of MCE promotes cement hydration. FIG. 5 shows the Thermogravimetric Analysis (TGA) signals for concrete samples prepared with and without MCE (ICC8000 and ICC5291, respectively). The concentrations of CH at concrete samples were calculated based on the aforementioned decomposition temperature ranges (CH is believed to decompose at a temperature range of 380-600° C.). The analysis indicates that the CH concentration is 4.5 and 7.2 for samples with and without MCE enhancer, respectively. These curves indicate a reduction in CH content of the mixtures cast with MCE enhancer, and that the enhancer has promoted the pozzolanic reactions that consumed the CH for CSH production.

The "dynamic" crystallization system established by using MCE interacts with all phases of water to provide an effective solution to many water-phase associated problems by: (1) minimizing liquid water penetration and consuming available free water crystal growth; (2) preventing freezing in the pores as it consumes water in a dynamic behavior of crystal growth (and minimizing its penetration) and assisting in heat storage for preventing internal freeze; and (3) reducing vapor-state water problems resulting from the re-condensation of vapor which makes it a medium for water associated problems.

Experimental results from an independent laboratory were obtained for assessing the durability of concrete prepared according to IDOT C4 mix design, with 2%, by weight of cement, addition of the MCE, compared to control samples without MCE. The mixes were comprised of Type I/II cement, and 50/50 blend of fine (silica-based sands) to coarse aggregates (one-inch limestone particles). The mixes were prepared utilizing 614 lbs. cement (IDOT C4), or 491 lbs. cement with 123 lbs. fly ash C class (as 20% replacement of the binder mass), as typical Iowa Department of Transportation PCC mixes that are used around the state of Iowa and the Midwest for a variety of applications, from paving to structural placements.

Figure 6:
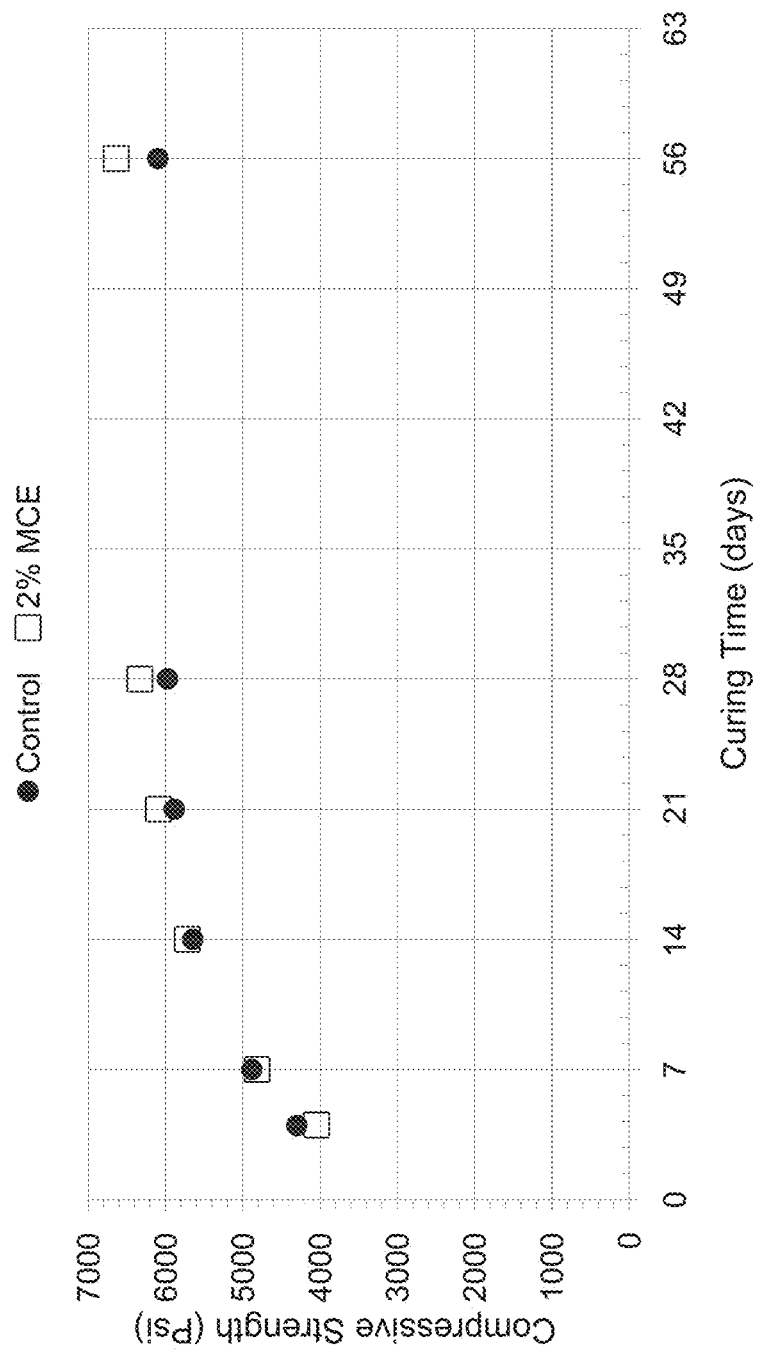
FIG. 6 illustrates enhanced compressive strength of MCE.
Figure 7:
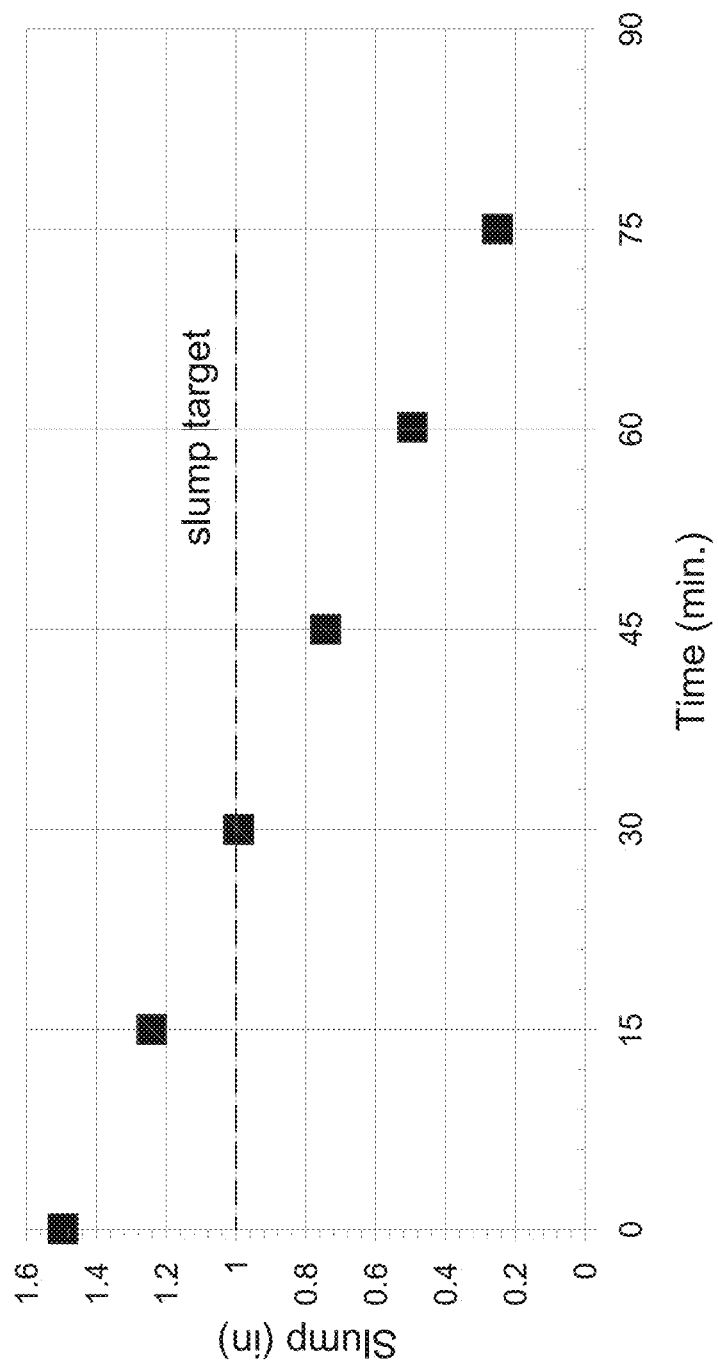
FIG. 7 illustrates enhanced workability of MCE.

The concrete mixes have been evaluated with regards to compressive strength, flexural strength, permeability, time of set, ASR, chloride ion penetration, mold growth and workability. Both compressive and flexural strength were increased. Each dosed mix indicated lower permeability than control samples, with a slightly better surface abrasion (resistance to wear). The MCE dosed concrete had a reduced ASR and no mold growth. The time of set was slightly slower, while workability was increased. MCE promoted cement hydration and reduced CH concentration. As shown in FIG. 6, the effective crystallization mechanism of MCE results in an increase in the compressive strength after 14 days (results are for the case of w/c ratio of 0.37). The results are from an independent laboratory testing according to ASTM C-31, C-39, C-143, C-172, C-192, C-231, and C-1064. As shown in FIG. 7, the effective crystallization mechanism of MCE enhances slump (results are for the case of concrete mix with a slump target of 1 inch). The results are from an independent laboratory testing according to ASTM.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications, and substitutions without departing from the spirit and scope of the invention.

What is claimed is:

1. A method for providing an admixture to be intermixed with uncured concrete for enhancing hydration during curing and reducing water penetration after curing, the method comprising:
   making a stable containerizable aqueous mixture comprising:
      at least 70% by weight water;
      0.5 to 2% by weight 2,3-Dihydroxybutanedioic acid;
      1 to 2% by weight anhydrous sodium salt of carbonic acid;
      approximately 1% by weight ethanoic acid;
      2 to 7% by weight alkali metal silicate;
      a surfactant;
      an anti-foaming agent;
      an emulsifier; and
      1 to 3% by weight silanetriol, methyl-, potassium salt;
   sealing the aqueous mixture in a container such that an unopened container maintained above 10° C. has a shelf life of at least one year.

2. The method of claim 1 and further comprising:
   wherein the surfactant is approximately 0.5% by weight nonylphenol polyethylene glycol ether;
   wherein the anti-foaming agent is approximately 0.5% by weight isopropyl alcohol; and
   wherein the emulsifier is approximately 0.01% by weight alkyl-benzene-sulfonic acid.

3. The method of claim 1 and further comprising:
   mixing the aqueous mixture with cement and water to form an uncured concrete mixture having an aqueous solution dispersed therein; and
   allowing the uncured concrete mixture to go through a curing process that cures the uncured concrete mixture and at least partially dehydrates the aqueous solution to form a cured concrete with the at least partially dehydrated solution dispersed therein.

4. The method of claim 3, wherein the at least partially dehydrated solution reduces water penetration into concrete matrices of the cured concrete by providing enhanced hydrophilic, hygroscopic, and hydrophobic characteristics to the cured concrete.

5. The method of claim 4 and further comprising:
   wherein the enhanced hydrophobic characteristic comprises repelling water at a surface of the cured concrete;
   wherein the enhanced hygroscopic characteristic comprises forming hygroscopic crystals within the concrete matrices of the cured concrete; and
   wherein the enhanced hydrophilic characteristic comprises forming hydrophilic crystals within the concrete matrices of the cured concrete.

6. The method of claim 3, wherein the aqueous solution dispersed in the uncured concrete mixture reduces a size of capillaries in the cured concrete.

7. The method of claim 3, wherein the at least partially dehydrated solution dispersed in the cured concrete reduces concrete damage caused by repeated freeze-thaw cycles.

8. The method of claim 3, wherein the at least partially dehydrated solution dispersed in the cured concrete reduces chloride ion penetration into the cured concrete and/or reduces mold growth on the cured concrete.

9. The method of claim 3, wherein, during the curing process, the aqueous solution enhances hydration of the uncured concrete, reduces alkali-silica reactions, and/or reduces calcium hydroxide.

10. The method of claim 3, wherein the aqueous solution increases a number of micro capillaries formed in the cured concrete during the curing process.

11. The method of claim 3, wherein the aqueous solution increases a compressive strength and/or a flexural strength of the cured concrete.

12. The method of claim 3, wherein the aqueous solution reduces heat loss during the curing process by entrapping water vapor molecules.

13. An aqueous mixture for mixing with uncured concrete, the aqueous mixture comprising:
   at least 70% by weight deionized water;
   approximately 0.5% by weight ethanoic acid;
   between 0.75 to 2% by weight 2,3-Dihydroxybutanedioic acid;
   between 1 to 2% by weight anhydrous sodium salt of carbonic acid;
   between 2% to 7% by weight alkali metal silicate solids;
   between 1% to 3% by weight silanetriol, methyl-, potassium salt;
   a surfactant;
   an anti-foaming agent; and
   an emulsifier.

14. The aqueous mixture of claim 13, wherein the aqueous mixture is sealed into a container such that an unopened container maintained above 10° C. has a shelf life of at least one year.

15. The aqueous mixture of claim 13 and further comprising:
   wherein the surfactant is approximately 0.5% by weight nonylphenol polyethylene glycol ether;
   wherein the anti-foaming agent is approximately 0.5% by weight isopropyl alcohol; and
   wherein the emulsifier is approximately 0.01% by weight alkyl-benzene-sulfonic acid.

16. A method for protecting cured concrete, comprising:
   mixing the aqueous mixture of claim 13 with uncured concrete to form an uncured concrete mixture.

17. The method of claim 16 and further comprising:
   allowing the uncured concrete mixture to cure;
   wherein the aqueous mixture forms a hydrophobic barrier on a surface of the cured concrete; and
   wherein the aqueous mixture forms hygroscopic and hydrophilic crystals within pores of the cured concrete.

18. The method of claim 17, wherein trihydroxy(methyl) silane ions from the aqueous mixture react with carbon dioxide to form the hydrophobic barrier.

19. The method of claim 17, wherein water penetration into concrete matrices of the cured concrete is reduced by the hygroscopic crystals absorbing water and the hydrophilic crystals swelling.

20. The method of claim 17 and further comprising:
   wherein the surfactant is approximately 0.5% by weight nonylphenol polyethylene glycol ether;
   wherein the anti-foaming agent is approximately 0.5% by weight isopropyl alcohol; and
   wherein the emulsifier is approximately 0.01% by weight alkyl-benzene-sulfonic acid.

* * * * *